United States Patent [19]

Denley

[11] Patent Number: 5,408,391
[45] Date of Patent: Apr. 18, 1995

[54] LEVEL INDICATING DEVICE FOR A VEHICLE HEADLAMP

[75] Inventor: Ronald S. Denley, Woodstock, Ill.

[73] Assignee: Elco Industries, Inc., Rockford, Ill.

[21] Appl. No.: 85,650

[22] Filed: Jun. 30, 1993

Related U.S. Application Data

[63] Continuation of Ser. No. 853,927, Mar. 19, 1992, abandoned.

[51] Int. Cl.⁶ .............................................. B60Q 1/00
[52] U.S. Cl. ..................................... 362/61; 362/101; 33/288; 33/335; 33/372
[58] Field of Search ................ 362/61, 66, 80, 101, 362/418, 419, 427, 428; 33/288, 335, 347, 354, 370, 371, 372, 379, 384, 385, 386, 387, 388, 389

[56] References Cited

U.S. PATENT DOCUMENTS

| | | | |
|---|---|---|---|
| 2,097,849 | 11/1937 | Torbert, Jr. | 33/388 |
| 2,557,291 | 6/1951 | Hubbard | 33/386 |
| 2,670,209 | 2/1954 | Fay | 33/372 |
| 2,940,174 | 6/1960 | Shoemaker | 33/335 |
| 3,612,854 | 10/1971 | Todd | 33/288 |
| 4,591,250 | 5/1986 | Woodruff | 33/379 |
| 4,802,067 | 1/1989 | Ryder et al. | 362/61 |
| 4,970,629 | 11/1990 | McMahan | 362/61 |
| 5,029,051 | 7/1991 | Shirai et al. | 362/66 |
| 5,031,081 | 7/1991 | Daumueller et al. | 362/66 |
| 5,055,980 | 10/1991 | Mochizuki | 362/66 |
| 5,083,244 | 1/1992 | Shirai et al. | 362/61 |
| 5,140,503 | 8/1992 | Lisak | 362/61 |
| 5,151,849 | 9/1992 | Nagengast et al. | 362/61 |

*Primary Examiner*—Carl D. Price
*Assistant Examiner*—Alan B. Cariaso
*Attorney, Agent, or Firm*—Leydig, Voit & Mayer

[57] ABSTRACT

The indicating device is adapted to be inserted into a housing on a headlamp frame with a slip fit and, once inserted, is automatically locked into place. The indicating device includes a bubble level having a vial which is molded integrally with a base adapted to be assembled with a spring metal retaining bracket with a slip fit. The retaining bracket coacts with the base to hold the indicating device in the housing and coacts with an adjusting screw to enable the vial to be tilted upwardly and downwardly to various positions relative to horizontal.

24 Claims, 4 Drawing Sheets

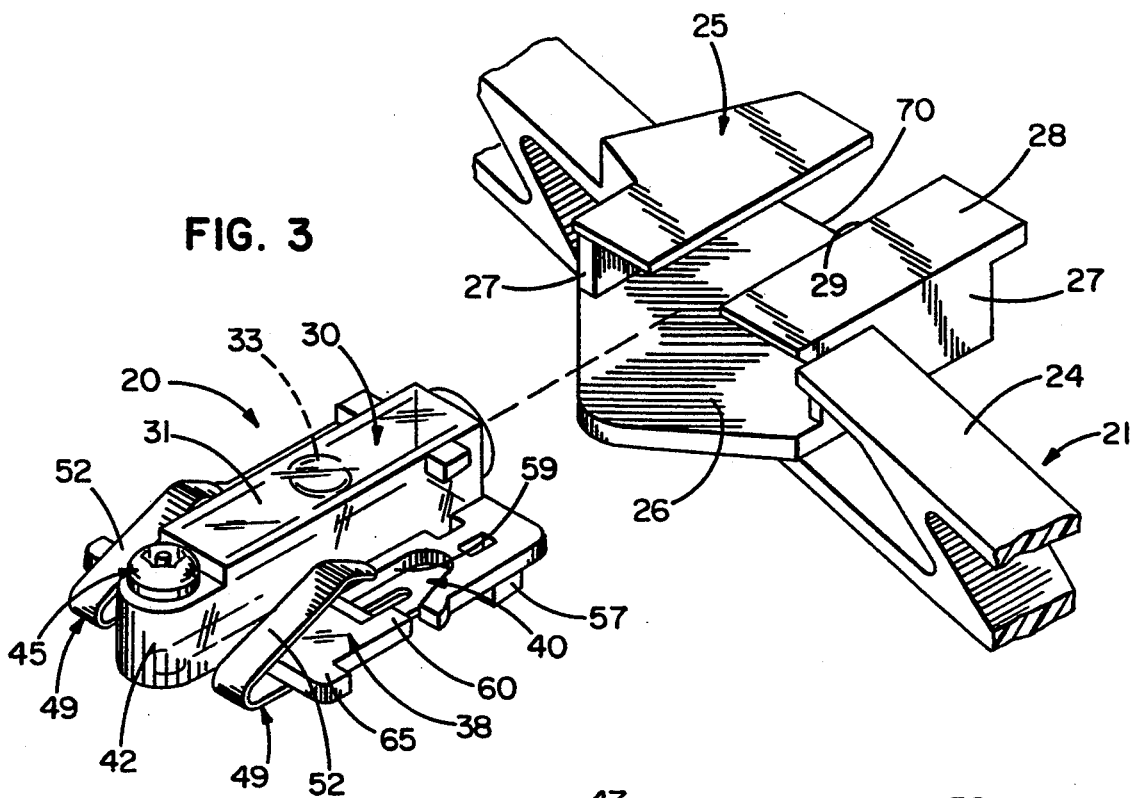
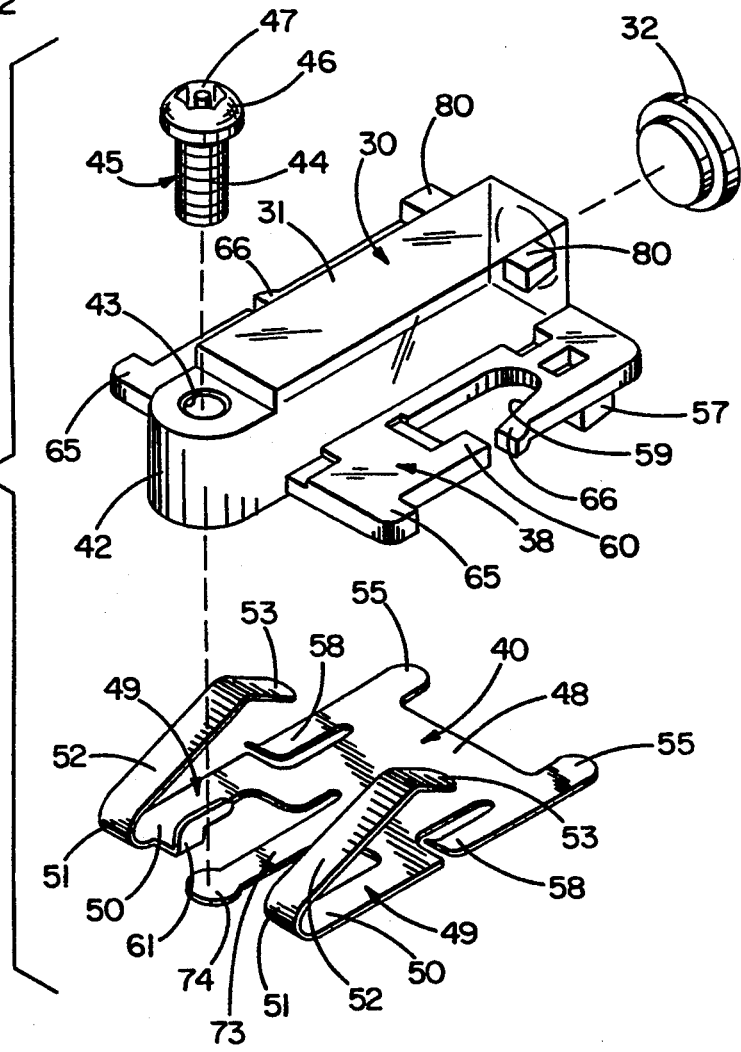

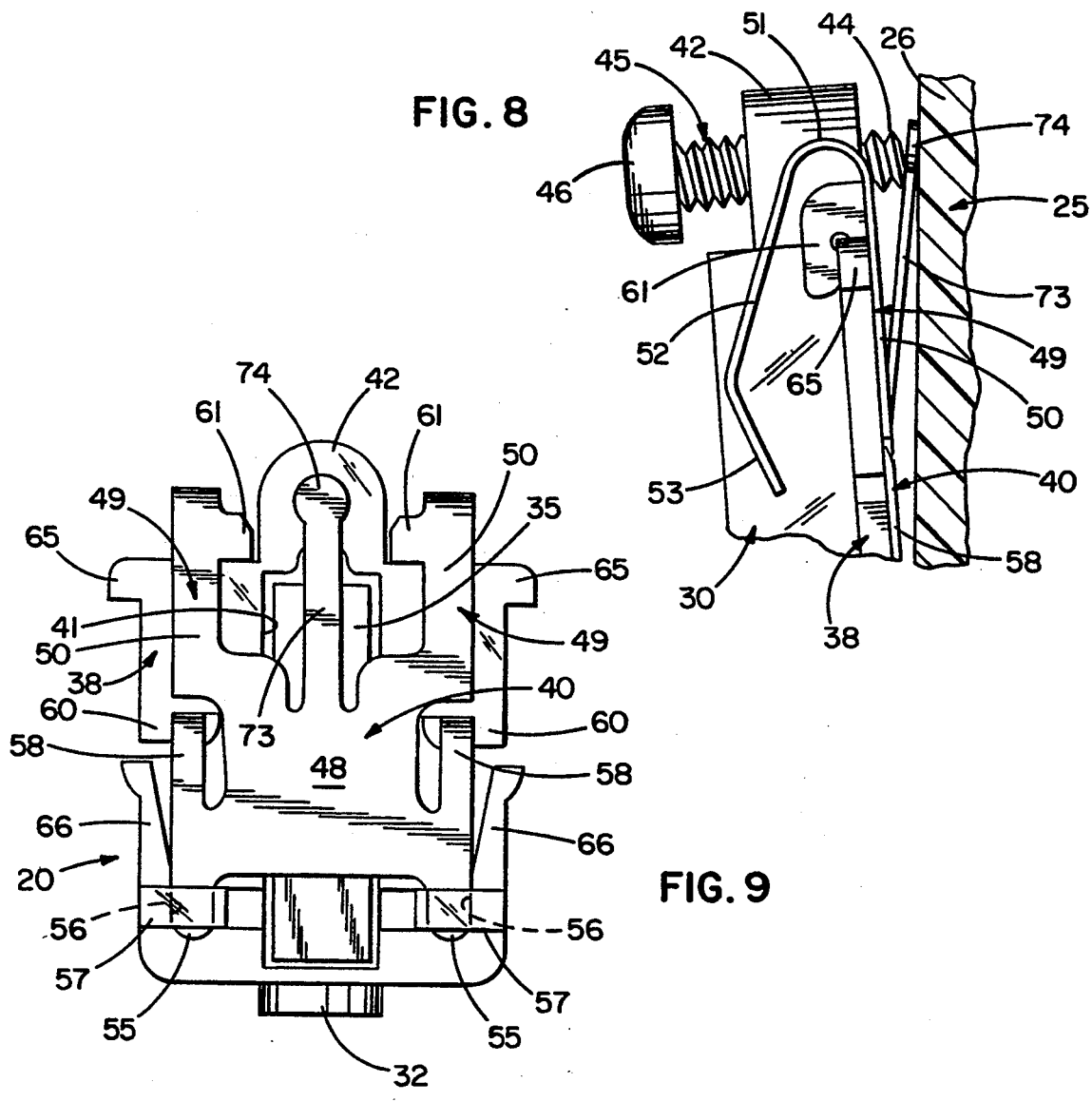
FIG. 8
FIG. 9
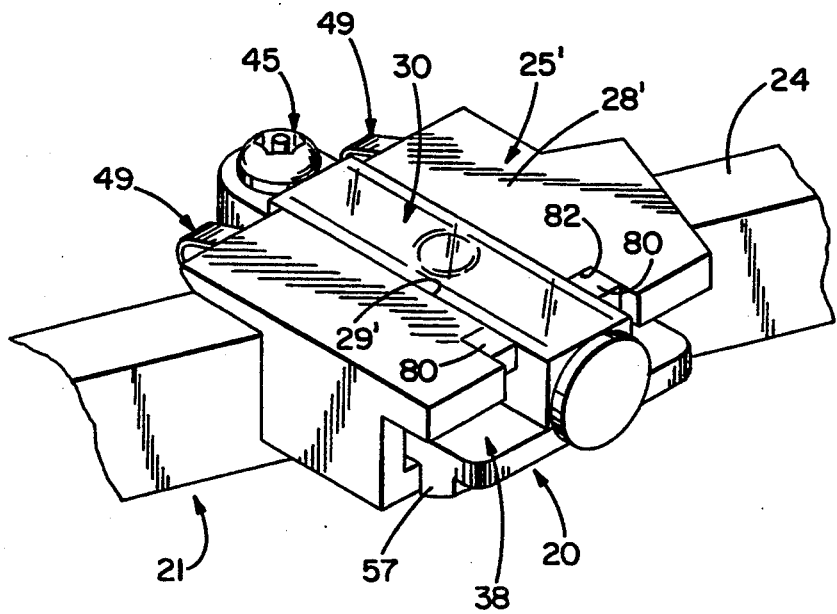
FIG. 10

LEVEL INDICATING DEVICE FOR A VEHICLE HEADLAMP

This is a continuation of application Ser. No. 07/853,927, filed Mar. 19, 1992, abandoned.

BACKGROUND OF THE INVENTION

This invention relates to a device for indicating the degree of tilt of a vehicle headlamp beam and, more specifically, to a device having a bubble level formed by a liquid-filled vial with a gas bubble therein that coacts with a graduated scale to indicate the degree of tilt of the vial from horizontal.

Such an indicating device typically is mounted on the frame or other component of the headlamp assembly. At the vehicle assembly plant, the frame is tilted about a horizontal axis to establish proper aim of the headlamp beam in a vertical direction. Once this is achieved, the indicating device is calibrated in order to "zero" the bubble and establish the preset position of the headlamp. If the headlamp subsequently becomes improperly aimed, the indicating device may be used to determine when the lamp has been adjusted back to the preset position.

SUMMARY OF THE INVENTION

The general aim of the present invention is to provide a high resolution, easily readable and comparatively low cost indicating device of the above type having relatively few components and adapted to be assembled quickly and easily with the headlamp frame by means of a simple slip fit.

A related object is to provide an indicating device in which the vial is molded integrally with a base adapted to be assembled with a spring metal retaining bracket by virtue of a slip fit between the base and the bracket.

Still another object is to use the retaining bracket to help hold the indicating device in assembled relation with the frame, to cushion the indicating device against vibration, and to facilitate calibration of the indicating device.

The invention also resides in the relatively simple construction of the retaining bracket and of the unitary vial/base.

These and other objects and advantages of the invention will become more apparent from the following detailed description when taken in conjunction with the accompanying drawings.

BRIEF DESCRIPTION OF THE DRAWINGS

FIG. 3 is an exploded perspective view of the indicating device and frame portion shown in FIG. 2.

FIG. 4 is an exploded perspective view of the components of the indicating device.

FIG. 8 is an enlarged view of certain components of the indicating device illustrated in FIGS. 6 and 7 and shows such components in moved positions.

FIG. 9 is a bottom plan view of the indicating device.

FIG. 10 is a view generally similar to FIG. 2 but is a front perspective showing the indicating device in connection with a different type of headlamp frame.

DETAILED DESCRIPTION OF THE PREFERRED EMBODIMENT

Figure 1:
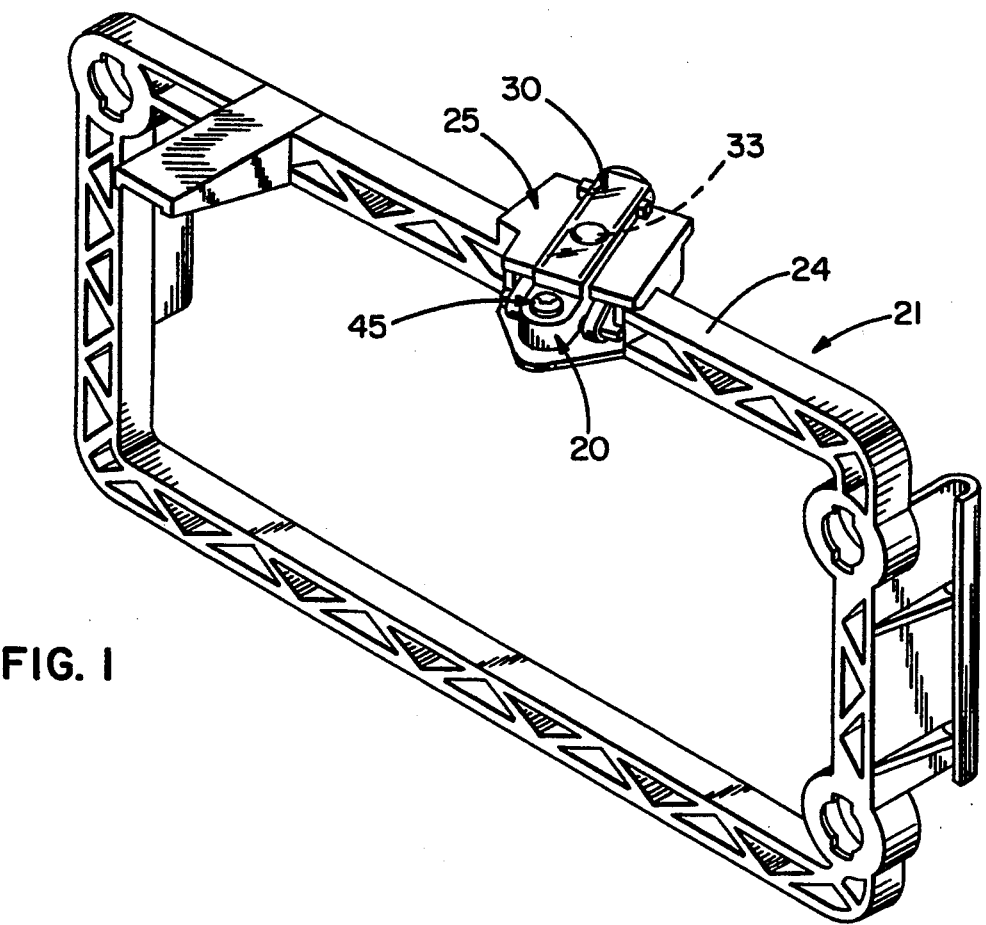
FIG. 1 is a rear perspective view of a typical vehicle headlamp frame equipped with a new and improved indicating device incorporating the unique features of the present invention.
Figure 2:
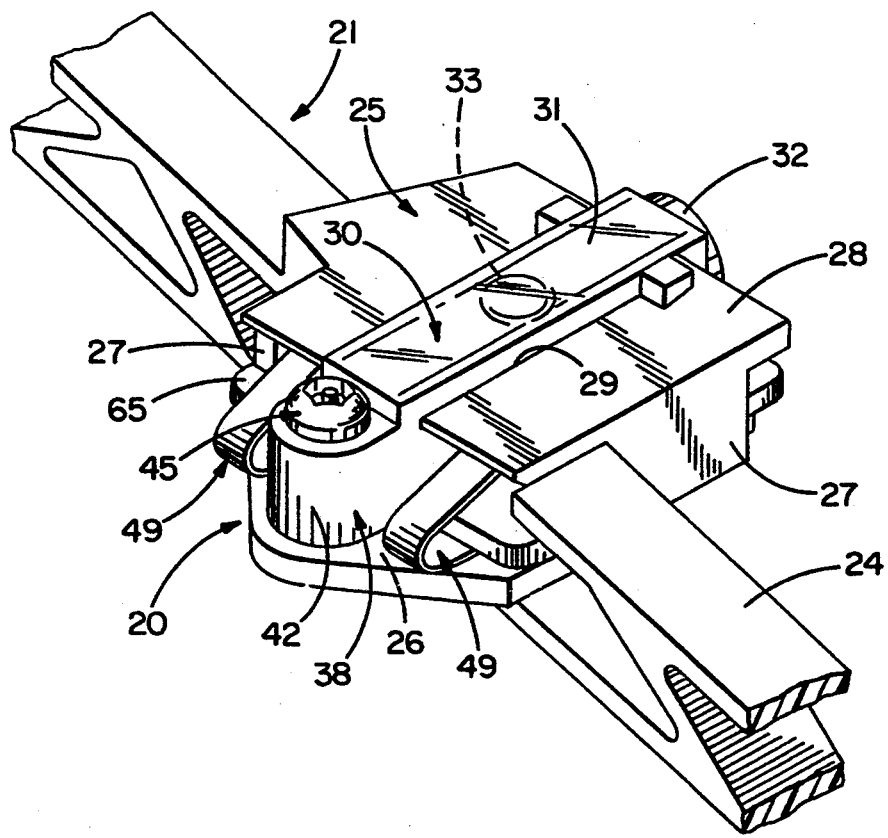
FIG. 2 is an enlarged rear perspective view of the indicating device and a portion of the headlamp frame.

For purposes of illustration, the invention has been shown in the drawings as incorporated in a level indicating device 20 which is associated with a frame 21 for holding a vehicle headlamp (not shown) and for mounting the headlamp on a vehicle body. As is conventional, the headlamp frame is supported on the body to pivot about a horizontal axis and is adapted to be pivoted about such axis by a manually operable adjusting device (not shown) which may, for example, be of the type disclosed in commonly assigned U.S. application Ser. No. 07/806,622, filed Dec. 13, 1991, now U.S. Pat. No. 5,193,905. During assembly of the vehicle, the frame is tilted as necessary to aim the headlamp properly in the vertical direction. Once the proper aim has been established, the indicating device is "zeroed" in order to establish the proper aim for future reference.

The present headlamp frame 21 is molded of plastic and includes an upper frame member 24 with a housing 25. The housing 25 of the frame 21 of FIG. 1 is shown most clearly in FIG. 3 and comprises a flat bottom wall 26, a pair of laterally spaced and upwardly projecting side walls 27, and a top wall 28. A generally longitudinally extending slot 29 is formed vertically through the top wall and extends between the front and rear ends of the housing. The various walls 26, 27 and 28 define an internal chamber within which a substantial portion of the indicating device 20 is housed, the chamber herein being open at both its rear end and at its forward end.

Figure 5:
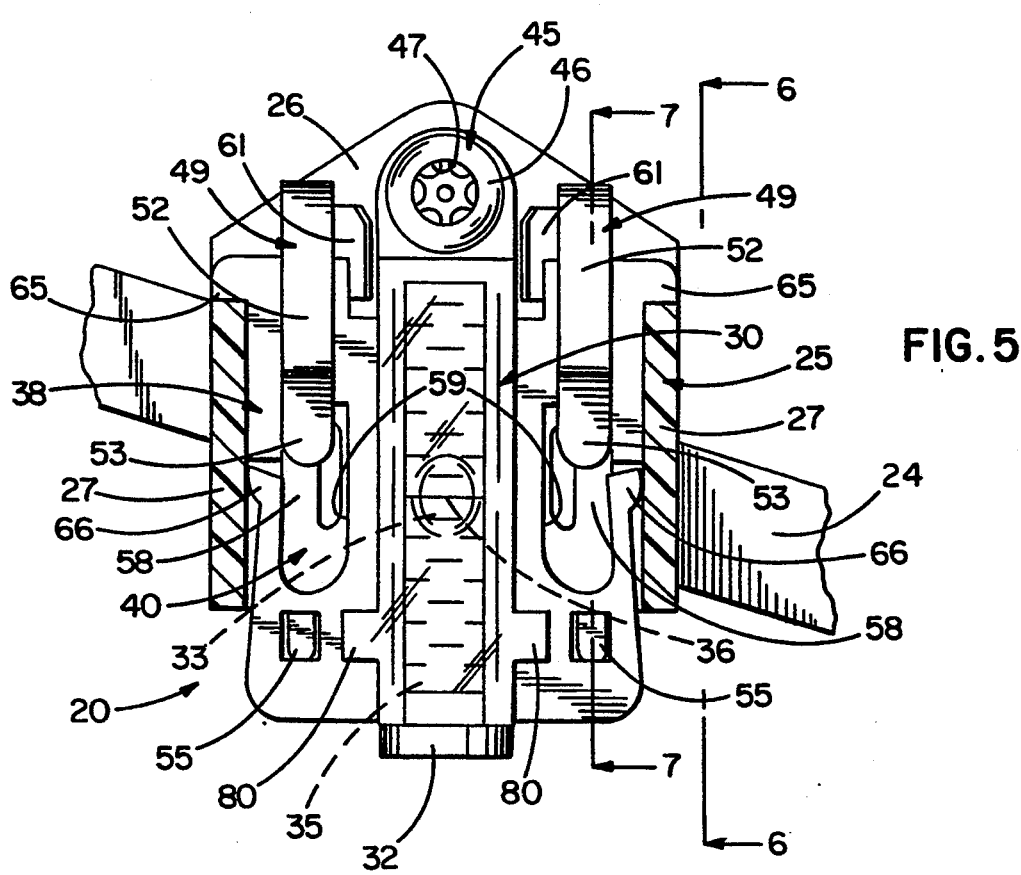
FIG. 5 is an enlarged view of the indicating device and the headlamp frame, portions of the frame being broken away and shown in section.

The present indicating device 20 includes a bubble level formed in part by a transparent vial 30 having a plastic body portion 31 with a generally rectangular external cross-sectional shape. The vial contains a viscous liquid which is sealed in the body portion of the vial by a generally circular cap 32 made of plastic and ultrasonically welded or otherwise suitably secured with a liquid-tight seal to the forward end of the body portion of the vial. A gas bubble 33 is entrapped in the liquid and, as is typical of bubble levels, moves toward that end of the vial that is tilted upwardly from horizontal. A graduated scale 35 (FIGS. 5 and 9) underlies the transparent vial 30 and coacts with the vial to indicate the degree of tilt of the vial from horizontal. In this instance, the graduations of the scale 35 are printed on a strip of plastic or similar material which is glued in place by an optically clear adhesive. The graduations include a "zero" mark 36 (FIG. 5) indicating that the vial is level when the bubble is centered over such mark, and further include various other marks indicative of the degree that the vial is out of level in one direction or the other. The vial has a radius of curvature that lies in the vertical aiming plane of the headlamp beam. The apex of such curvature coincides with the "zero" mark, and the spacing of the graduations is related geometrically to the radius of curvature.

According to the present invention, the vial 30 is molded integrally with a base 38 (FIG. 4) which serves to hold the indicating device 20 in the housing 25 of the frame 21. In addition, a retaining bracket 40 interfits with the base to help hold the indicating device in the housing, to facilitate calibration of the indicating device and to isolate the vial from vibration in the frame 21. The indicating device is particularly characterized by the fact that the base 38 and the bracket 40 may be simply slipped into assembled relation with one another and then quickly slipped into assembled relation with the housing 25.

More specifically, the base 38 is molded as a unit with the vial 30 and is made of a hard but resilient plastic such as transparent nylon. The base includes a center portion immediately underlying the vial and further includes wing portions projecting laterally from the sides of the vial adjacent the bottom thereof. A shallow pocket 41 (FIG. 9) is molded in the underside of the center portion of the base to serve as a locator for the graduated scale 35.

The base 38 also is formed with a nose 42 (FIG. 4) located at the rear end of the vial 30 and just slightly smaller in height than the vial. A hole 43 is formed vertically through the nose and is adapted to receive the shank 44 of an adjusting or calibrating screw 45 whose head 46 is formed with a tamperproof driving recess 47 requiring a special tool for turning the screw. The screw preferably is of the thread-forming type and cuts threads in the plastic of the hole 43 as an incident to being initially driven into the hole.

The retaining bracket 40 (FIG. 4) is made of a single piece of thin spring metal (e.g., spring steel) and includes a generally flat plate 48 which underlies the base 38. Two laterally spaced legs 49 are formed integrally with the rear end of the plate. Each leg includes a generally horizontal rearwardly extending portion 50, an upwardly curved portion 51 at the rear end of the horizontal portion, an upwardly and forwardly extending cantilevered upper portion 52, and a relatively short downwardly and forwardly extending portion 53.

Assembly of the retaining bracket 40 with the base 38 is effected by sliding the bracket forwardly with respect to the base. As an incident thereto, the plate 48 slides beneath the base and, as the bracket approaches the limit of its forward movement, two laterally spaced tabs 55 (FIG. 4) at the forward end of the plate telescope into similarly shaped and rearwardly opening pockets 56 (FIG. 9) formed in a pair of laterally spaced lugs 57 molded integrally with and depending from the base adjacent the forward end thereof. By virtue of the tabs 55 telescoping into the pockets 56, the forward end portion of the bracket is prevented from separating vertically from the base.

As the bracket 40 is slid forwardly relative to the base 38, means automatically interlock with one another to prevent return rearward movement of the bracket with respect to the base. Herein, these means comprise two laterally spaced and cantilevered fingers 58 (FIG. 4) located adjacent the sides of the plate 48 and capable of flexing vertically relative to the plate. The rear end portion of each finger projects upwardly from the plane of the plate 48. During assembly, the plate is pressed tightly against the underside of the base 38 and, as the plate is slid forwardly, the rear end portions of the fingers 58 are flexed downwardly by the base. As the plate approaches its forward limit of travel, the fingers 58 encounter openings 59 (FIG. 4) formed vertically through the base 38 and, just as forward movement of the plate is stopped, the rear end portions of the fingers spring upwardly into the openings. Engagement of the rear portions of the fingers 58 with the rearwardly facing forward edge portions of the openings 59 holds the plate against rearward movement relative to the base. The outboard sides of the fingers also engage tabs 60 (FIGS. 4 and 9) adjacent the rear of the openings to prevent lateral movement of the bracket with respect to the base. Such lateral movement is also prevented by virtue of the tabs 55 engaging the laterally facing surfaces of the pockets 56 in the lugs 57.

Figure 6:
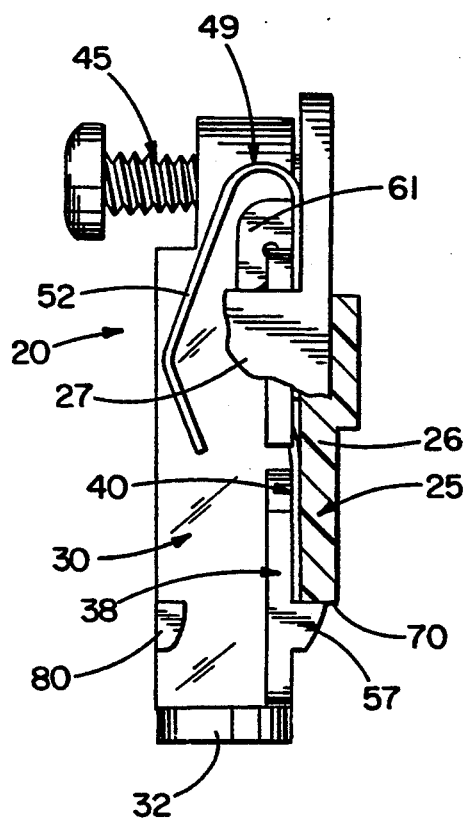
FIG. 6 is a side elevational view of the indicating device as seen along the line 6—6 of FIG. 5, portions of the headlamp frame being broken away and shown in section.
Figure 7:
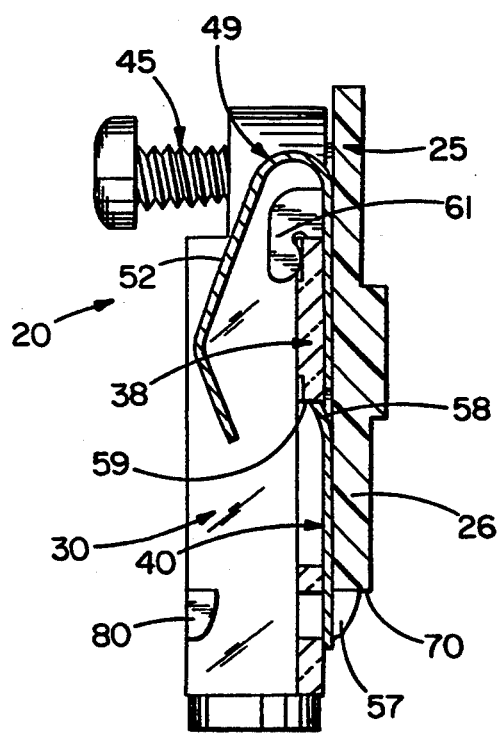
FIG. 7 is a cross-section taken substantially along the line 7—7 of FIG. 5.

Forward movement of the bracket 40 relative to the base 38 is stopped by a pair of laterally spaced lugs 61 (FIGS. 6–9) which also serve to prevent the rear end portion of the bracket from separating vertically from the base. As shown most clearly in FIGS. 4–9, the lugs 61 are bent upwardly from the inboard sides of the horizontal portions 52 of the legs 49 near the rear of the horizontal portions. Each lug is generally L-shaped and, as the bracket 40 is slid forwardly relative to the base 38, the vertically extending portions of the lugs engage the rear edge of the base as shown in FIGS. 6 and 7 just as the free end portions of the fingers 58 spring upwardly into the openings 59. Such engagement stops further forward movement of the bracket so that the latter becomes longitudinally trapped between the fingers 58 and the lugs 61. Just shortly before the vertical portions of the L-shaped lugs 61 engage the rear edge of the base, the forwardly extending and generally horizontal portions of the lugs move into overlying relation with the upper side of the rear end portion of the base. As a result, the horizontal portions of the lugs engage the base to prevent the rear portion of the bracket from separating vertically from the base.

To summarize, the bracket 40 is assembled to the base 38 by simply sliding the bracket forwardly relative to the base while keeping the plate 48 of the bracket pressed upwardly against the underside of the base. Once the assembly is completed, the tabs 55 and the lugs 61 coact with the base to prevent vertical separation of the bracket and the base. The lugs 61 also prevent the bracket from moving forwardly relative to the base while the free end portions of the spring fingers 58 prevent the bracket from shifting rearwardly with respect to the base. Lateral movement of the bracket relative to the base is prevented by the tabs 55 and the fingers 58.

As discussed above, the indicating device 20 is adapted to be slipped into assembled relation with the housing 25. Once the device is slipped into the housing, it is automatically held in place.

For this purpose, the base 38 includes the depending lugs 57 adjacent its forward end, a pair of laterally projecting ears 65 (FIG. 4) adjacent its rear end, and a pair of cantilevered latching fingers 66 about midway between its ends. The free end portions of the latching fingers 66 project laterally outwardly beyond the side edge portions of the base 38 and are adapted to be flexed laterally inwardly.

To assemble the indicating device 20 with the housing 25, the device is inserted into the rear open end of the housing and is slid forwardly with the vial 30 in alignment with the slot 29 in the top wall 28 such that the upper end portion of the vial moves into the slot. During initial forward sliding of the device, the depending lugs 57 ride along the bottom wall 26 of the housing while the cantilevered fingers 66 move between the side walls 27. The fingers are deflected inwardly by the side walls and, together with the side edge portions of the base 38, constrain the device laterally within the housing 25. In addition, the resilient fingers 66 coact with the side walls to create a frictional force which resists—but does not prevent—longitudinal movement of the indicating device in the housing.

With continued forward movement of the indicating device 20 in the housing 25, the upper end portions 52 of the spring legs 49 enter the housing and are deflected downwardly by the underside of the top wall 28. This creates a further frictional force resisting longitudinal movement of the device and, in addition, causes a downward spring force to be exerted on the device. As the device is slid further forwardly, the rear edges of the lugs 57 move past the forward edge 70 (FIGS. 3, 6 and 7) of the bottom wall 26. As a result, the spring force snaps the lugs 57 downwardly past the forward edge of the wall 26 and thus the lugs coact with the wall to hold the indicating device 20 against rearward movement. As the lugs 57 snap downwardly past the forward edge of the wall 26, the ears 65 move into engagement with the rear ends of the side walls 27. This prevents further forward movement of the indicating device and causes the device to become longitudinally trapped in the housing 25.

Accordingly, assembly of the indicating device 20 with the housing 25 is effected by sliding the device forwardly into the housing, causing the vial 30 to enter into the slot 29 in the top wall 28. Lateral movement of the device is prevented by virtue of the base 38 and the fingers 66 engaging the side walls 27 while longitudinal movement is prevented by the lugs 57 and the ears 65. As pointed out above, the lugs 57 are automatically snapped downwardly past the forward edge 70 of the bottom wall 26 by the spring force of the upper end portions 52 of the legs 49.

The present indicating device 20 may be removed from the housing 25 by lifting upwardly on the forward end of the base 38 to cause the lugs 57 to clear the forward edge 70 of the bottom wall 26 and then by sliding the device rearwardly. If desired, detent recesses may be formed in the inboard sides of the side walls 27 to receive and interlock with the free end portions of the fingers 66. In such a case, the indicating device 20 is tamperproof in that a special tool is required to release the fingers from the detent recesses and permit removal of the indicating device from the housing 25.

After the indicating device 20 has been installed in the housing 25, the adjusting screw 45 may be used to tilt the device and "zero" the air bubble 33 relative to the scale 35. As shown in FIGS. 4 and 8, an elongated tang 73 is formed integrally with and projects rearwardly from the plate 48 of the bracket 40 and includes a generally circular pad 74 which underlies the lower end of the shank 44 of the screw 45. When the screw is tightened, it bears downwardly against the pad 74 which, in turn, bears downwardly against the bottom wall 26 of the housing 25. This forces the rear end portion of the device 20 to pivot upwardly about a fulcrum defined by the forward edge 70 of the bottom wall 26 and enables the air bubble 33 to shift from front-to-rear in the vial in order to bring the bubble to the zero position. During tightening of the screw, the pad 74 prevents the end of the metal screw from digging into and forming a depression in the bottom wall 26 of the housing 25.

When the screw 45 is loosened, the spring force created by the upper end portions 52 of the legs 49 causes the rear end portion of the vial 30 to pivot downwardly about the aforementioned fulcrum. Thus, loosening of the screw serves to effect rear-to-front movement of the air bubble 33 for purposes of zeroing the bubble.

As shown in FIG. 4, two laterally spaced lugs 80 are formed integrally with and project laterally from the vial 30 adjacent the forward end thereof. This enables the indicating device 20 to be used with a modified housing 25' of the type illustrated in FIG. 10, the top wall 28' of the housing 25' being formed with an enlarged notch 82 adjacent the forward end of the slot 29'. When the indicating device 20 is slipped into the rear end of the housing 25' the lugs 80 ride along the upper side of the top wall 28' until they encounter the notch 82. At such time, the spring force of the legs 49 snaps the lugs 80 downwardly into the notch 82 and, thereafter, the lugs engage the forwardly facing edge of the notch to prevent rearward movement of the indicating device. Thus, the lugs 80 fulfill the purpose of the lugs 57 and enable the indicating device to be used universally with two different types of housings 25 and 25'. When the device is used with the housing 25, the lugs 80 are spaced above the top wall 28 when the lugs 57 engage the bottom wall 26 and thus the lugs 80 do not interfere with the lugs 57 snapping downwardly past the forward edge 70 of the bottom wall.

From the foregoing, it will be apparent that the present invention brings to the art a new and improved device 20 for indicating the degree of tilt of a vehicle headlamp beam with high resolution. The device is of relatively simple and inexpensive construction in that it requires only five components, namely, the liquid-filled vial 30 with its integral base 38, the end cap 32, the calibrating scale 35, the retaining bracket 40 and the adjusting screw 45. Assembly of the base and the bracket may be effected quickly and easily by simply slipping the two together. Once these components are assembled, the device as a whole may be installed in the housing 25, 25' with a slip fit. When the device is installed, the upper portions 52 of the spring legs 49 not only perform the functions described previously but also tend to isolate the vial 31 from vibration in the housing. The resilient fingers 66 also tend to dampen vibration.

I claim:

1. An indicating device for a vehicle headlamp, said device comprising a base molded of resilient plastic and having first and second ends, having first and second laterally spaced side edge portions and having upper and lower sides, a transparent vial having a body portion molded integrally with and projecting upwardly from the upper side of said base between the side edge portions thereof, said vial containing liquid having a gas bubble therein, means associated with said vial and coacting with said bubble to indicate when said vial is horizontal, a retaining bracket made of a single piece of spring metal, connecting means on said base and said bracket and interfitting with one another to hold said base and said bracket in assembled relation, said bracket having a plate underlying said base and having a pair of laterally spaced legs formed integrally with said plate and projecting beyond one end of said base, said legs then curving upwardly around said one end of said base and having cantilevered upper free end portions located on opposite sides of said vial in straddling relation therewith and spaced above the upper side of said base in overlying relation therewith.

2. An indicating device as defined in claim 1 in which said connecting means comprise laterally spaced fingers formed integrally with and projecting upwardly from said plate, and laterally spaced openings in said base and receiving said fingers, said openings having edges which engage said fingers to prevent said bracket from moving toward the first end of said base.

3. An indicating device as defined in claim 2 in which said connecting means further include lugs formed integrally with said legs and engageable with the first end of said base to prevent said bracket from moving toward the second end of said base.

4. An indicating device as defined in claim 3 in which said lugs also include surfaces engageable with the upper side of said base adjacent the first end thereof to restrict vertical separation of said bracket from said base.

5. An indicating device as defined in claim 4 in which said connecting means further include laterally spaced tabs formed integrally with said plate, and pockets formed in said base adjacent the second end of the base and receiving said tabs, said pockets having surfaces which engage said tabs to restrict vertical separation of said bracket from said base.

6. An indicating device as defined in claim 1 further including a threaded hole extending substantially vertically through one end portion of said base adjacent one end of said vial, and an adjusting screw threaded through said hole, said screw having a driving head located above said base and having a lower end located below said base.

7. An indicating device as defined in claim 6 further including a tang formed integrally with and extending cantilever fashion from said plate, said tang having a free end portion underlying and engaging the lower end of said screw.

8. An indicating device as defined in claim 1 further including stop means integral with said base adjacent the first end thereof and having stop surfaces facing toward the second end of said base.

9. An indicating device as defined in claim 8 further including stop means integral with one of said base and said vial adjacent the second end of said base and having stop surfaces facing toward the first end of said base.

10. An indicating device as defined in claim 9 in which the stop means adjacent the second end of said base are integral with and project downwardly from the lower side of said base.

11. An indicating device as defined in claim 9 in which the stop means adjacent the second end of said base are integral with and are located adjacent the upper side of said vial.

12. An indicating device as defined in claim 7 further including stop means integral with and projecting downwardly from the lower side of said base adjacent the second end thereof and having stop surfaces facing toward the first end of said base, and alternately usable stop means integral with the upper side of said vial adjacent the second end of said base and having stop surfaces facing toward the first end of said base.

13. An indicating device as defined in claim 9 in which each of said side edge portions includes an integral cantilevered latching finger adapted to be squeezed laterally inwardly and adapted to spring laterally outwardly by virtue of the resiliency of the plastic of said base.

14. The combination of (A) a vehicle headlamp component, and (B) a device for indicating the degree of tilt of said component, said component including a housing having top and bottom walls, having laterally spaced side walls and having first and second ends with at least said first end being open, there being a slot formed through said top wall about midway between said side walls and extending from said first end toward said second end, said device comprising a base molded of plastic and having first and second ends, having first and second side edge portions and having upper and lower sides, a transparent vial having a body portion molded integrally with and projecting upwardly from the upper side of said base between the side edge portions thereof, said vial containing liquid having a gas bubble therein, a graduated scale underlying said vial and coacting with said bubble to indicate the degree of tilt of said vial from horizontal, a retaining bracket made of a single piece of spring metal, connecting means on said base and said bracket and interfitting with one another to hold said base and said bracket in assembled relation, said bracket having a plate underlying said base and having a pair of laterally spaced legs formed integrally with said plate and projecting beyond said first end of said base, said legs then curving upwardly around said first end of said base and having cantilevered upper free end portions located on opposite sides of said vial in straddling relation therewith and spaced above the upper side of said base in overlying relation therewith, said device being assembled with said housing with said vial located within said slot and with the cantilevered upper end portions of said legs engaging the underside of the top wall of said housing, the cantilevered upper end portions of said legs pressing resiliently against the underside of the top wall of said housing to help hold said device in assembled relation with said housing, and retaining means on said base engaging said housing and coacting with the cantilevered upper end portions said legs to hold said device in assembled relation with said housing.

15. The combination defined in claim 14 in which said retaining means comprise stop means integral with said base adjacent the first end thereof and engaging said side walls adjacent the first end of said housing to restrict movement of said base toward the second end of said housing.

16. The combination defined in claim 15 in which said retaining means include stop means integral with and projecting downwardly from the lower side of said base adjacent the second end thereof and engaging said bottom wall adjacent the second end of said housing to restrict movement of said base toward the first end of said housing.

17. The combination defined in claim 15 in which said retaining means include stop means integral with the upper side of said vial adjacent the second end of said base and engaging said top wall adjacent the second end of said housing to restrict movement of said base toward the first end of the housing.

18. The combination defined in claim 15 in which said retaining means include cantilevered fingers formed integrally with and projecting laterally outwardly from said base, said fingers pressing resiliently against the inboard sides of the side walls of said housing.

19. The combination defined in claim 14 further including a threaded hole extending substantially vertically through said base adjacent the first end thereof and adjacent one end of said vial, an adjusting screw threaded through said hole, said screw having a driving head located above said base and having a lower end located below said base, a tang formed integrally with and extending cantilever fashion from said plate, said tang being sandwiched between said bottom wall and the lower end of said screw, rotation of said screw in one direction causing the lower end of said screw to press said tang against said bottom wall and force the first end of said base upwardly, rotation of said screw in the opposite direction causing the cantilevered upper end portions of said legs to force the first end of said base downwardly.

20. An indicating device for a vehicle headlamp, said device comprising a base molded of resilient plastic and having first and second ends, having first and second laterally spaced side edge portions and having upper and lower sides, a transparent vial having a body portion molded integrally with and projecting upwardly from the upper side of said base between the side edge portions thereof, said vial containing liquid having a gas bubble therein, means associated with said vial and coacting with said bubble to indicate when said vial is horizontal, a retaining bracket made of a single piece of spring metal, connecting means on said base and said bracket and interfitting with one another to hold said base and said bracket in assembled relation, said bracket having a plate underlying said base and having a pair of laterally spaced legs formed integrally with said plate, said legs having first generally horizontal sections projecting in one direction beyond one end of said base, having second sections integral with and extending upwardly from said first sections in opposing relation with said one end of said base, and having cantilevered sections integral with said second sections and extending generally opposite of said first sections, said cantilevered sections being located on opposite sides of said vial in straddling relation therewith and having at least portions spaced above the upper side of said base in overlying relation therewith.

21. The combination of (A) a vehicle headlamp component, and (B) a device for indicating the degree of tilt of said component, said component including a housing having top and bottom walls, having laterally spaced side walls and having first and second ends with at least said first end being open, said bottom wall having an upright edge located adjacent the second end of said housing and facing away from the first end thereof, there being a slot formed through said top wall about midway between said side walls and extending from said first end toward said second end, said device comprising a base molded of plastic, a transparent vial molded integrally with said base, said vial containing liquid having a gas bubble therein, a graduated scale underlying said vial and coacting with said bubble to indicate the degree of tilt of said vial from horizontal, a retaining bracket made of a single piece of spring metal, connecting means on said base and said bracket and interfitting with one another to hold said base and said bracket in assembled relation, said bracket having a plate underlying said base and having a pair of laterally spaced legs formed integrally with said plate, said legs having flexible portions located on opposite sides of said vial and spaced above said base, said device being assembled with said housing with said vial located within said slot and with the flexible portions of said legs engaging the underside of the top wall of said housing, the flexible portions of said legs pressing resiliently against the underside of the top wall of said housing, and retaining means integral with one of said base and said plate, said retaining means engaging said upright edge of said bottom wall of said housing and coacting with the flexible portions of said legs to hold said device in assembled relation with said housing.

22. The combination defined in claim 21 in which said retaining means comprise stop means projecting downwardly from said one of said base and said plate and being snapped downwardly by said legs into face-to-face relation with said edge after said device has been inserted into said housing from the first end thereof and has been moved within said housing a predetermined distance toward the second end thereof.

23. The combination of (A) a vehicle headlamp component, and (B) a device for indicating the degree of tilt of said component, said component including a housing having first and second ends and having a bottom wall, said bottom wall having an upright edge located adjacent the second end of said housing and facing away from the first end thereof, said device comprising a base molded of plastic, a transparent vial molded integrally with said base, said vial containing liquid having a gas bubble therein, a graduated scale underlying said vial and coacting with said bubble to indicate the degree of tilt of said vial from horizontal, a retaining bracket made of a single piece of spring metal, connecting means on said base and said bracket and interfitting with one another to hold said base and said bracket in assembled relation, said bracket having a plate underlying said base and having a pair of laterally spaced legs formed integrally with said plate, said legs having flexible portions located on opposite sides of said vial and spaced above said base, and retaining means integral with one of said base and said plate, said retaining means engaging said upright edge of said bottom wall of said housing to prevent said device from moving toward said first end of said housing.

24. The combination defined in claim 23 in which said retaining means comprise stop means projecting downwardly from said one of said base and said plate and being snapped downwardly by said legs into face-to-face relation with said edge after said device has been inserted into said housing from the first end thereof and has been moved within said housing a predetermined distance toward the second end thereof.

* * * * *